Aug. 5, 1930.  J. C. REGAN  1,772,267
SCROLL CHUCK
Filed May 23, 1928
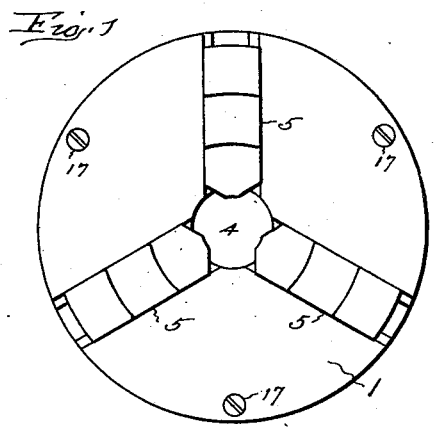
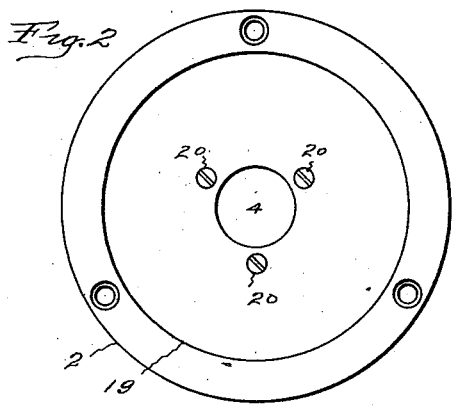
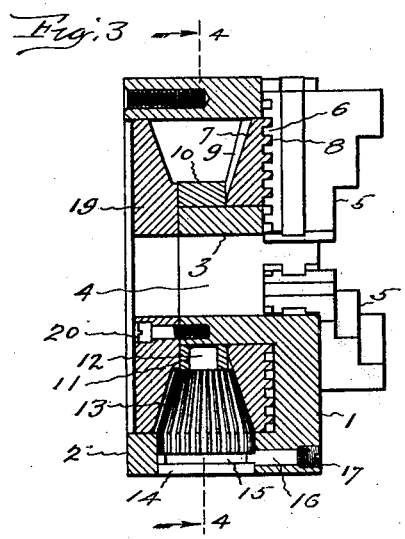
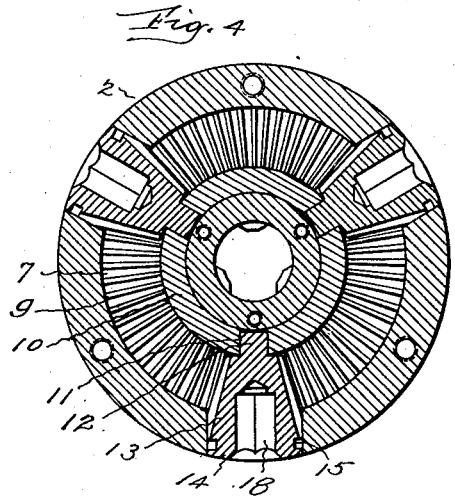
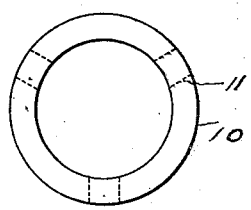
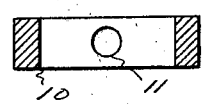
INVENTOR
Joseph C. Regan,
by Harry P. Williams
atty.

Patented Aug. 5, 1930

1,772,267

UNITED STATES PATENT OFFICE

JOSEPH C. REGAN, OF WEST HARTFORD, CONNECTICUT, ASSIGNOR TO THE E. HORTON & SON COMPANY, OF WINDSOR LOCKS, CONNECTICUT, A CORPORATION OF CONNECTICUT

SCROLL CHUCK

Application filed May 23, 1928. Serial No. 279,927.

This invention relates to the construction of geared scroll chucks, that is, those chucks in which the jaws are moved in and out radially of the body by means of scroll gears on the faces of toothed disks that are rotated by pinions set radially in the chuck bodies.

It has been customary in the manufacture of this type of chuck to support the inner ends of the pinions in bearing holes drilled into an inner hub that is integral with the body, which construction provides fixed bearing supports for the inner ends of the pinions. This requires very accurate machining and careful assembling of the parts to ensure proper action, which adds materially to the cost of manufacture of this type of chuck.

The object of the present invention is to so organize the structure that the cost of machining and assembling the parts will be reduced and the pinions will be properly supported by simple means which will automatically adjust themselves to variations in the manufacture and the changed relations of the scroll gear and pinions, and thus eliminate all possibility of such binding of these elements as would add friction and wear as well as an increase in the amount of force required to tighten the jaws upon a tool or piece of stock.

In attaining this end the hub in the interior of the body upon which the scroll gear turns is reduced in diameter and a floating ring with bearing holes for the inner ends of the pinions is placed on the hub back of the scroll gear in such position that not only do the pinion bearing holes automatically align themselves with the outer pinion bearings in the body, but the ring will act as a thrust support for holding the scroll gear in proper engagement with the jaws when the back plate is fastened in place.

In the accompanying drawings Fig. 1 is a view looking at the front or jaw face of the chuck. Fig. 2 is a view looking toward the back of the chuck. Fig. 3 is a diametrical section of the chuck. Fig. 4 is a transverse section on the plane indicated by the dotted line 4—4 on Fig. 3. Fig. 5 is a side view of the pinion bearing ring. Fig. 6 is a section of the pinion bearing ring.

The body of the chuck illustrated has a circular front face 1 with an annular rim 2 and an interior hub 3 having a central opening 4, the body being designed to be fastened to the face plate of the machine with which the chuck is to be used in the usual manner. The jaws 5 which may be of any common type are radially movable in slots in the front face of the body and they are provided on their rear faces with oblique rack teeth 6.

The disk 7 with its front face provided with scroll teeth 8 and its rear face provided with bevel teeth 9 is fitted within the body so as to turn upon the hub with its scroll teeth engaging the teeth of the jaws. Slipped upon the hub and having a working fit thereon is a ring 10. This ring is provided with the required number of perforations 11 spaced the proper distance apart to receive the studs 12 which form the inner journals of the beveled pinions 13, the teeth of which pinions mesh with the teeth on the back of the scroll disk.

The outer ends of the pinions have hubs 14 that fit openings in the annular rim of the body. These hubs have grooves 15 into which project pins 16 held by screws 17 whereby the pinions are retained in place but are free to rotate. In the outer ends of the pinions are angular sockets 18 for the reception of the key by means of which the pinions are to be rotated. A circular plate 19 is fastened to the hub in the body by screws 20 to close in the back of the pinion recesses and hold the pinion bearing ring in place.

When the back plate is in position the pinion bearing ring holds the scroll disk in position with its scroll teeth correctly engaging the jaw teeth. The bearing ring is very simple to make and can be accurately ground to fit and drilled for the pinion journals, and when in position it not only forms a backing for the scroll disk but it adjusts itself freely on the hub so that the inner pinion bearings will accurately align with the outer pinion bearings, and, furthermore, as pressure is applied to the scroll disk by reason of the turning of a pinion this floating bearing ring automatically adjusts itself to the changing relations of the pinions and scroll gear.

The invention claimed is:—

1. A scroll chuck having a body with a front face, an annular perforated rim and an inner central hub, toothed jaws movable radially in the front face of the body, a perforated ring rotatable on said hub, pinions with their outer ends fitting the perforations in the body rim and held from angular movement thereby, said pinions having at their inner ends journals projecting into the perforations in said ring, a disk rotatable on said hub, said disk having teeth on its front face engaging the jaw teeth and teeth on its rear face engaging said pinions, and means fastened to the body and retaining said ring against the back of said disk.

2. A scroll chuck having a body with a front face, a radially perforated rim and an inner central hub, a scroll disk having teeth on its front and rear faces, a radially perforated floating ring mounted on the hub back of the scroll disk, a pinion with its outer end fitting the perforation in the body rim and held from angular movement thereby, said pinion engaging the teeth on the back of the scroll disk and having at its inner end a journal that projects into the perforation of said floating ring.

3. A scroll chuck having a body with an inner central hub, a scroll disk rotatable on said hub, a perforated ring rotatably mounted on the hub back of the scroll disk, pinions supported and held from angular movement by the body, said pinions engaging the scroll disk and having at their inner ends journals that project into the perforations of said rotatable ring, and a back plate fastened to the body and holding the said floating ring in place.

JOSEPH C. REGAN.